US012784687B2

(12) United States Patent
Lee et al.

(10) Patent No.: US 12,784,687 B2
(45) Date of Patent: Nov. 3, 2026

(54) DISPLAY APPARATUS AND METHOD FOR CONTROLLING THE SAME

(71) Applicant: SAMSUNG ELECTRONICS CO., LTD., Suwon-si (KR)

(72) Inventors: Daehee Lee, Suwon-si (KR); Sungjin Lim, Suwon-si (KR); Seungjun Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/374,463

(22) Filed: Oct. 30, 2025

(65) Prior Publication Data

US 2026/0100162 A1 Apr. 9, 2026

Related U.S. Application Data

(63) Continuation of application No. PCT/KR2025/014841, filed on Sep. 23, 2025.

(30) Foreign Application Priority Data

Oct. 4, 2024 (KR) ........................ 10-2024-0135179
Nov. 26, 2024 (KR) ........................ 10-2024-0171554

(51) Int. Cl.
*G09G 3/3233* (2016.01)

(52) U.S. Cl.
CPC ... *G09G 3/3233* (2013.01); *G09G 2300/0852* (2013.01); *G09G 2320/0233* (2013.01); (Continued)

(58) Field of Classification Search
None
See application file for complete search history.

(56) References Cited

U.S. PATENT DOCUMENTS 9,620,058 B2 4/2017 Lee
9,779,677 B2 10/2017 Igawa
(Continued)

FOREIGN PATENT DOCUMENTS

KR 10 2005 0066711 A 6/2005
KR 10 2015 0019025 A 2/2015
(Continued)

OTHER PUBLICATIONS

Communication dated Jan. 16, 2026, issued by the International Searching Authority in International Application No. PCT/KR2025/014841 (PCT/ISA/210 and PCT/ISA/237).

*Primary Examiner* — Stephen T. Reed
(74) *Attorney, Agent, or Firm* — Sughrue Mion, PLLC

(57) ABSTRACT

A display apparatus including a display panel including a substrate, a plurality of pixel circuits disposed on the substrate, and at least one sensing thin film transistor (TFT) configured to detect a current flowing through the plurality of pixel circuits; a temperature sensor disposed on the substrate and configured to detect a temperature of the substrate; a memory configured to store a look up table relating the current flowing through the plurality of pixel circuits to a first temperature of the display panel; and at least one processor configured to: determine the first temperature of the display panel based on the current flowing through the plurality of pixel circuits and the look-up table, determine a final temperature of the display panel based on a difference between the determined first temperature of the display panel and the temperature of the substrate detected by the temperature sensor.

20 Claims, 14 Drawing Sheets

(52) U.S. Cl.
CPC ................. *G09G 2320/041* (2013.01); *G09G 2320/0633* (2013.01); *G09G 2360/16* (2013.01)

(56) References Cited

U.S. PATENT DOCUMENTS

| | | | |
|---|---|---|---|
| 10,621,913 B2 | 4/2020 | Furukawa et al. | |
| 11,315,521 B2 | 4/2022 | Kim et al. | |
| 2016/0155384 A1 | 6/2016 | Kim et al. | |
| 2024/0021158 A1* | 1/2024 | Choi .................... | G09G 3/3233 |

FOREIGN PATENT DOCUMENTS

| | | | |
|---|---|---|---|
| KR | 10 2016 0012309 | A | 2/2016 |
| KR | 10-2016-0083591 | A | 7/2016 |
| KR | 10-1853885 | B1 | 5/2018 |
| KR | 10 2019 0033407 | A | 3/2019 |
| KR | 10-2354392 | B1 | 1/2022 |
| KR | 10-2022-0096266 | A | 7/2022 |
| KR | 10-2462834 | B1 | 11/2022 |
| KR | 10-2588337 | B1 | 10/2023 |
| WO | 2017/104631 | A1 | 6/2017 |

* cited by examiner

FIG. 9

| OPERATING TIME(Hr) | TEMPERATURE DIFFERENCE OF DISPLAY PANEL(℃) |
|---|---|
| 10000 | 10.50 |
| 3000 | 7.40 |
| 2000 | 3.96 |
| 300 | 0.00 |
| 144 | -0.70 |

FIG. 14

| OPERATING TIME(Hr) | TEMPERATURE DIFFERENCE OF DISPLAY PANEL(℃) | TEMPERATURE DIFFERENCE AFTER CORRECTION USING TEMPERATURE SENSOR(℃) |
|---|---|---|
| 10000 | 10.50 | 0.74 |
| 3000 | 7.40 | 1.67 |
| 2000 | 3.96 | 2.23 |

DISPLAY APPARATUS AND METHOD FOR CONTROLLING THE SAME

CROSS-REFERENCE TO RELATED APPLICATIONS

This application is a bypass continuation application of International Application No. PCT/KR2025/014841, filed on Sep. 23, 2025, which claims priority to Korean Patent Application No. 10-2024-0135179, filed on Oct. 4, 2024, and Korean Patent Application No. 10-2024-0171554, filed on Nov. 26, 2024, in the Korean Intellectual Property Office, the disclosures of which are incorporated by reference herein in their entireties.

BACKGROUND

1. Field

The disclosure relates to a display apparatus that uses a light emitting device to display an image, and a method for controlling the same.

2. Description of Related Art

In general, a display apparatus is a kind of output apparatus that converts acquired or stored electrical information into visual information to display the visual information for users. The display apparatus is widely used in various fields, such as home or places of business.

The display apparatus may be classified into a self-luminous display in which each pixel emits light by itself and a non-self-luminous display that requires a separate light source.

A liquid crystal display (LCD) which is a representative non-self-luminous display includes a backlight unit that supplies light from the rear of a display panel, a liquid crystal layer that acts as a switch to pass/block light, and a color filter that changes the supplied light to the desired color. Accordingly, the LCD has a complex structure and has a limited implementation such as a small thickness.

On the other hand, a self-luminous display in which each pixel emits light by itself by including a light emitting element for each pixel does not require components such as a backlight unit and a liquid crystal layer, and may exclude a color filter. Accordingly, the self-luminous display may have a simple structure and a high degree of design freedom. The self-luminous display may also realize thin thickness as well as excellent contrast ratio, brightness and viewing angle.

For stable operation of such display apparatuses, when the surface temperature of the display panel reaches a certain temperature, the luminance may be reduced to decrease the surface temperature.

SUMMARY

Additional aspects will be set forth in part in the description which follows and, in part, will be apparent from the description, or may be learned by practice of the presented embodiments.

According to an aspect of the disclosure, a display apparatus including a display panel including a substrate, a plurality of pixel circuits disposed on the substrate, and at least one sensing thin film transistor (TFT) configured to detect a current flowing through the plurality of pixel circuits; a temperature sensor disposed on the substrate and configured to detect a temperature of the substrate; a memory configured to store a look-up table relating the current flowing through the plurality of pixel circuits to a first temperature of the display panel; and at least one processor configured to: determine the first temperature of the display panel based on the current flowing through the plurality of pixel circuits and the look-up table, determine a final temperature of the display panel based on a difference between the determined first temperature of the display panel and the temperature of the substrate detected by the temperature sensor.

The at least one processor is further configured to set the difference between the determined first temperature of the display panel and the temperature of the substrate detected by the temperature sensor as an offset value, based on the difference being equal to or greater than a reference temperature.

The at least one processor is further configured to determine the final temperature of the display panel by adding the offset value to the determined first temperature of the display panel.

The at least one processor is further configured to determine the determined first temperature of the display panel as the final temperature of the display panel, based on the difference between the determined first temperature of the display panel and the temperature of the substrate detected by the temperature sensor being less than a reference temperature.

The at least one processor is further configured to perform luminance control for reducing a brightness of light emitted from the plurality of pixel circuits, based on the final temperature of the display panel being equal to or greater than a reference temperature.

The temperature sensor is disposed at a position in an edge region of the substrate to detect a temperature of the edge region of the substrate, and the at least one processor is further configured to: determine a temperature at an edge region of the display panel based on the look-up table and a current flowing through a pixel circuit corresponding to the position of the temperature sensor from among the plurality of pixel circuits, wherein the difference between the determined first temperature of the display panel and the temperature of the substrate detected by the temperature sensor includes a difference between the determined temperature at the edge region of the display panel and the temperature at the edge region of the substrate detected by the temperature sensor.

The at least one processor is further configured to: set the difference between the determined temperature at the edge region of the display panel and the temperature at the edge region of the substrate as an offset value, based on the difference between the determined temperature at the edge region of the display panel and the temperature at the edge region of the substrate being equal to or greater than a reference temperature, and determine the final temperature of the display panel by adding the offset value to the first temperature of the display panel determined based on the look-up table and the current flowing through the plurality of pixel circuits.

Each pixel circuit of the plurality of pixel circuits includes a sensing TFT of the at least one sensing TFT configured to detect a current flowing through the corresponding pixel circuit.

The determined first temperature of the display panel is a determined surface temperature of the display panel.

According to an aspect of the disclosure a method for controlling a display apparatus including a display panel including a substrate, a plurality of pixel circuits disposed on the substrate, and at least one sensing thin film transistor (TFT) configured to detect a current flowing through the plurality of pixel circuits, a temperature sensor disposed on the substrate and configured to detect a temperature of the substrate, and a memory configured to store a look-up table relating the current flowing through the plurality of pixel circuits to a first temperature of the display panel. The method includes determining the first temperature of the display panel based on the current flowing through the plurality of pixel circuits and the look-up table; and determining a final temperature of the display panel based on a difference between the determined first temperature of the display panel and the temperature of the substrate detected by the temperature sensor.

The determination of the final temperature of the display panel includes setting the difference between the determined first temperature of the display panel and the temperature of the substrate detected by the temperature sensor as an offset value, based on the difference being equal to or greater than a reference temperature.

The determination of the final temperature of the display panel further includes determining the final temperature of the display panel by adding the offset value to the determined first temperature of the display panel.

The determination of the final temperature of the display panel includes determining the determined first temperature of the display panel as the final temperature of the display panel, based on the difference between the determined first temperature of the display panel and the temperature of the substrate detected by the temperature sensor being less than a reference temperature.

The method further includes performing luminance control for reducing a brightness of light emitted from the plurality of pixel circuits, based on the final temperature of the display panel being equal to or greater than a reference temperature.

The detection of the temperature of the substrate includes detecting a temperature at an edge region of the substrate, and determining of the final temperature of the display panel includes determining a temperature at an edge region of the display panel based on the look-up table and a current flowing through a pixel circuit corresponding to a position of the temperature sensor from among the plurality of pixel circuits. The difference between the determined first temperature of the display panel and the temperature of the substrate detected by the temperature sensor includes a difference between the determined temperature at the edge region of the display panel and the temperature at the edge region of the substrate detected by the temperature sensor.

The determination of the final temperature of the display panel further includes setting the difference between the determined temperature at the edge region of the display panel and the temperature at the edge region of the substrate detected by the temperature sensor as an offset value, based on the difference between the determined temperature at the edge region of the display panel and the temperature at the edge region of the substrate being equal to or greater than a reference temperature; and determining the final temperature of the display panel by adding the offset value to the first temperature of the display panel determined based on the look-up table and the current flowing through the plurality of pixel circuits.

Each pixel circuit of the plurality of pixel circuits includes a sensing TFT of the at least one sensing TFT configured to detect a current flowing through the corresponding pixel circuit.

The determined first temperature of the display panel is a determined surface temperature of the display panel.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 9 is a diagram illustrating errors with respect to an operating time of a display apparatus according to an embodiment;

FIG. 14 is a diagram illustrating errors reflecting temperature sensor detection results according to an embodiment.

DETAILED DESCRIPTION

Figure 1:
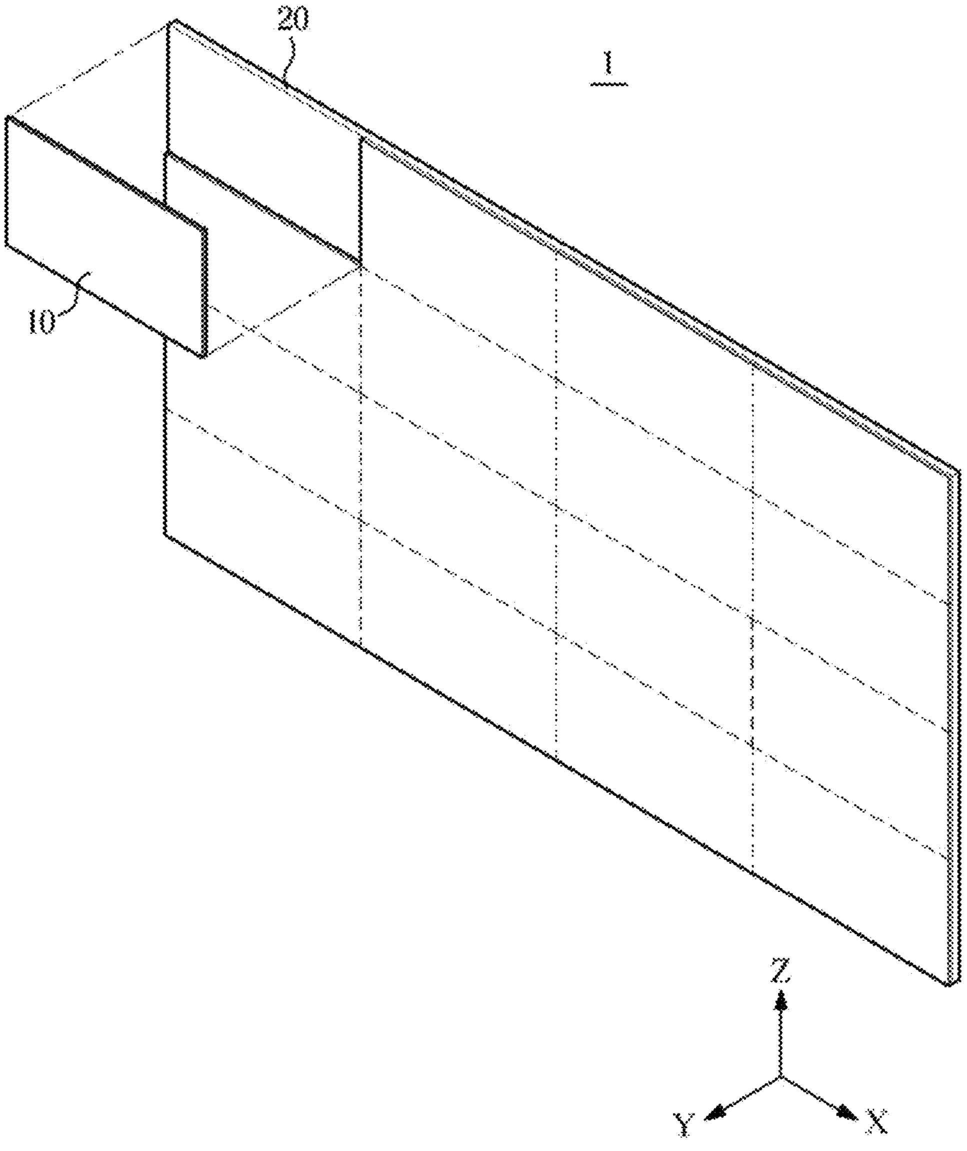
FIG. 1 is a perspective view illustrating an example of a display module and a display apparatus having the same according to an embodiment.

Embodiments described in the specification and configurations shown in the accompanying drawings are merely examples of the disclosure, and various modifications may replace the embodiments and the drawings of the disclosure at the time of filing of the application.

In connection with the description of the drawings, similar reference numerals may be used for similar or related elements.

The singular form of a noun corresponding to an item may include one or a plurality of the items unless clearly indicated otherwise in a related context.

In the disclosure, phrases, such as “A or B”, “at least one of A and B”, “at least one of A or B,” “A, B or C,” “at least one of A, B and C,” and “at least one of A, B, or C”, may include any one or all possible combinations of items listed together in the corresponding phrase among the phrases.

As used herein, the term “and/or” includes any and all combinations of one or more of associated listed items.

Terms such as “1st”, “2nd”, or “first” or “second” may be used simply to distinguish an element from other elements, without limiting the element in other aspects (e.g., importance or order).

When an element (e.g., a first element) is referred to as being “coupled” or “connected” with or without the terms “functionally” or “communicatively” to another element (e.g., second element), the first element can be connected to the second element directly (e.g., by wire), wirelessly, or via a third element.

It will be understood that when the terms “includes,” “comprises,” “including,” and/or “comprising,” when used in this specification, specify the presence of stated features, figures, steps, operations, components, members, or combinations thereof, but do not preclude the presence or addition of one or more other features, figures, steps, operations, components, members, or combinations thereof.

It will be understood that when a certain element is referred to as being “connected to”, “coupled to”, “supported by” or “in contact with” another element, it can be directly or indirectly connected to, coupled to, supported by, or in contact with the other element. When an element is indirectly connected to, coupled to, supported by, or in contact with another element, it may be connected to, coupled to, supported by, or in contact with the other element through a third element.

It will also be understood that when an element is referred to as being “on” or “over” another element, it can be directly on the other element or intervening elements may also be present.

Hereinafter, an embodiment of the disclosure will be described with reference to the accompanying drawings.

Like reference numerals denote like elements throughout the specification. In the specification, all elements of the embodiments are not described, and general contents in the art or repeated contents between the embodiments will not be described. Terms such as “portion”, “module”, and “member” may be embodied as hardware or software. According to embodiments, a plurality of “portion”, “module”, and “member” may be implemented as a single element or a single “portion”, “module”, and “member” may include a plurality of elements.

Throughout the specification, when a part is referred to as being “connected” to another part, it includes “directly connected” to another part and “indirectly connected” to another part, and the “indirectly connected” to another part includes “connected” to another part through a wireless communication network, or electrically connected to another part through wiring, soldering, or the like.

In addition, when a part “includes” an element, another element may be further included, rather than excluding the existence of another element, unless otherwise described.

Throughout the specification, when a member is referred to as being “on” another member, the member is in contact with another member or yet another member is interposed between the two members.

Throughout the specification, when an element transmits or transfers a signal or data to another element, it does not preclude another element existing between the corresponding element and another element, and the signal or data is transmitted or transferred through another element unless otherwise described.

Through the specification, the expression of an ordinal number such as “first” and “second” is used to distinguish a plurality of elements, and the used ordinal number does not indicate an arrangement order, a manufacturing order, importance, and the like of the members.

The singular forms include plural forms unless there are obvious exceptions in the context.

Reference numerals used for method steps are just used for convenience of explanation, but not to limit an order of the steps. Thus, unless the context clearly dictates otherwise, the written order may be practiced otherwise.

As used herein, expressions such as “at least one of,” when preceding a list of elements, modify the combination of the elements. For example, the expression, “at least one of a, b, or c,” should be understood as including only a, only b, only c, both a and b, both a and c, both b and c, or all of a, b, and c.

Hereinafter, a display module and a display apparatus including the display module according to an aspect will be described with reference to the accompanying drawings.

Figure 2:
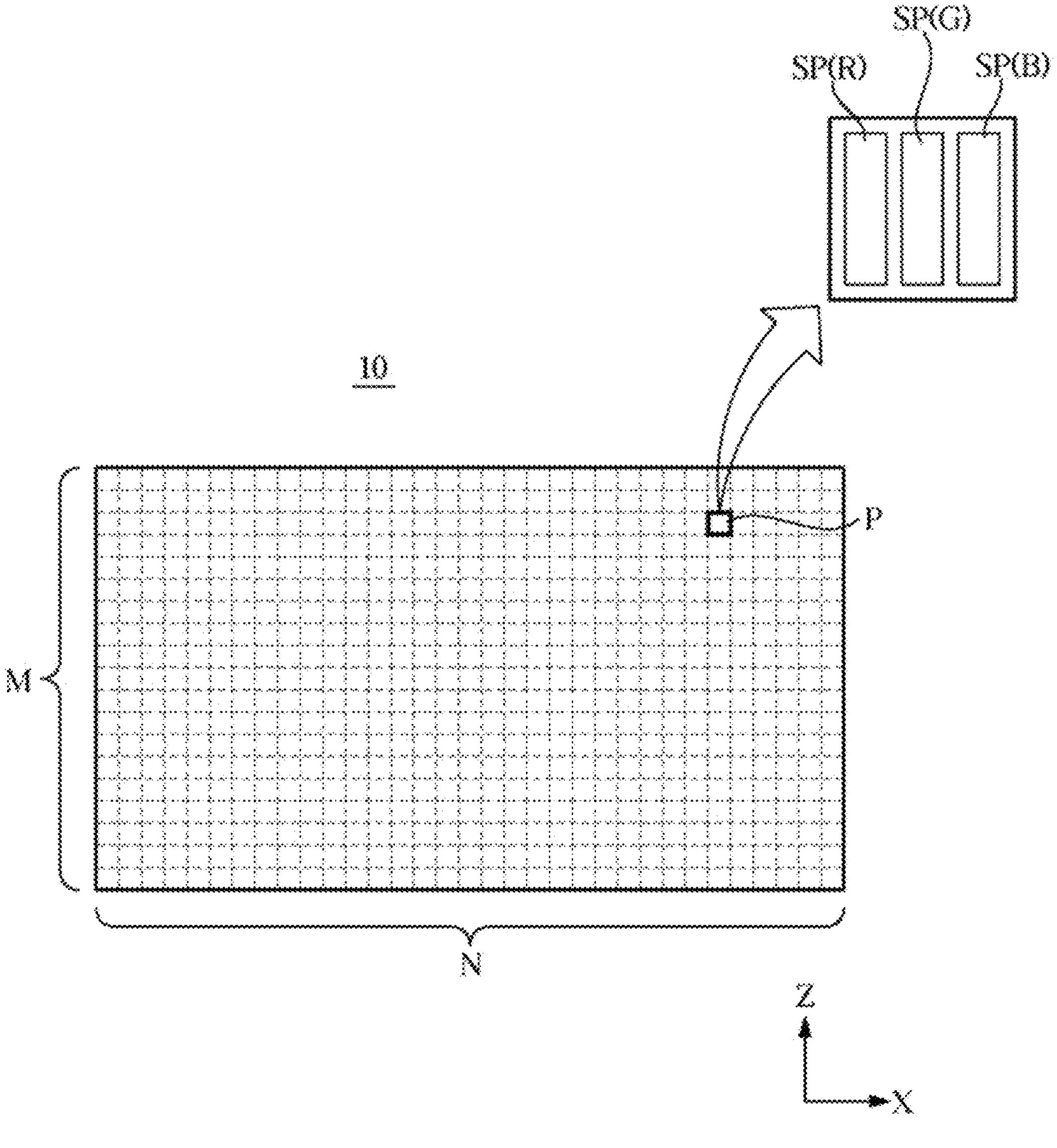
FIG. 2 is a diagram illustrating an example of an arrangement of pixels constituting a unit module of a display apparatus according to an embodiment.

FIG. 1 is a perspective view illustrating an example of a display module and a display apparatus having the same according to an embodiment, and FIG. 2 is a diagram illustrating an example of an arrangement of pixels constituting a unit module of a display apparatus according to an embodiment.

The display apparatus according to an embodiment is a self-luminous display apparatus having pixels each having a light emitting device (LED) arranged therein to emit light for itself. Hence, unlike a liquid crystal display device, the display apparatus dispenses with such components as a backlight unit, a liquid crystal layer, etc., thereby implementing thinness, having a simple structure, and allowing various changes in design.

In addition, in the display apparatus according to an embodiment, an organic light emitting device, such as an organic light emitting diode, may be used as the light emitting device disposed in each of the pixels.

Meanwhile, a three-dimensional coordinate system of XYZ-axes illustrated in FIG. 1 is based on the display apparatus 1, a plane on which a screen of the display apparatus 1 is positioned is an XZ-plane, and a direction in which an image is output or a direction in which an inorganic light emitting device emits light is a +Y direction. Because the coordinate system is based on the display apparatus 1, the same coordinate system may be applied to both of cases in which the display apparatus 1 is lying flat and in which the display apparatus 1 is in a standing state.

Generally, since the display apparatus 1 is used in a standing state, and a user watches an image from the front of the display apparatus 1, the +Y direction in which the image is output may be referred to as a forward direction, and the opposite direction may be referred to as a rearward direction.

In addition, the display apparatus 1 is generally manufactured in a lying state. Accordingly, a −Y direction of the display apparatus 1 may be referred to as a downward direction and the +Y direction may be referred to as an upward direction. That is, in an embodiment, which will be described below, the +Y direction may also be referred to as an upward direction or forward direction, and the −Y direction may also be referred to as a downward direction or rearward direction.

Except for an upper surface and a lower surface of the display apparatus 1 or the display module 10 having a flat plate shape, all of the remaining four surfaces may be referred to as side surfaces regardless of a posture of the display apparatus 1 or the display module 10.

In FIG. 1, a case in which the display apparatus 1 includes a plurality of display modules to implement a large-area screen is illustrated, but the embodiment of the display apparatus 1 is not limited thereto. The display apparatus 1 may include a single display module 10 and may be implemented as a television (TV), a wearable device, a portable device, a personal computer (PC) monitor, or the like.

Referring to FIG. 2, the display module 10 may include pixels of an M×N (M and N are integers greater than or equal to two) array i.e., a plurality of pixels which are two-dimensionally arranged. FIG. 2 conceptually illustrates an arrangement of pixels, and it should be understood that pixels of the display module 10 may be located not only an active area in which pixels are arranged but also a bezel area or wiring area on which an image is not displayed.

In the embodiment, a case in which some components are two-dimensionally arranged may include not only a case in which some components are arranged on the same plane but also a case in which some components are arranged on different planes parallel to each other. In addition, the case in which the corresponding components are arranged on the same plane does not denote that upper ends of the arranged components should be positioned on the same plane and may include a case in which the upper ends of the arranged components are positioned on different planes parallel to each other.

A pixel P may be formed with at least three subpixels which output light having different colors. For example, a single pixel P may be formed with three subpixels SP (R), SP (G) and SP (B)) respectively corresponding to red R, green G, and blue B. In this case, a red subpixel SP (R) may output red light, a green subpixel SP (G) may output green light, and a blue subpixel SP (B) may output blue light.

However, the pixel arrangement of FIG. 2 is only an example to which the display module 10 and the display apparatus 1 according to an embodiment are applicable, and subpixels may also be arranged along a Z-axis direction, and may not be arranged in a line, and subpixels may be implemented to have sizes that are different from each other. The sizes or arrangement types of the subpixels are not limited as long as a single pixel includes a plurality of subpixels to implement various colors.

In addition, the pixel P does not necessarily include the red subpixel SP (R) which outputs the red light, the green subpixel SP (G) which outputs the green light, and the blue subpixel SP (B) which outputs the blue light. The pixel may also include a subpixel which outputs yellow light or white light. That is, a color or type of light output from each subpixel and the number of subpixels are not limited.

Figure 3:
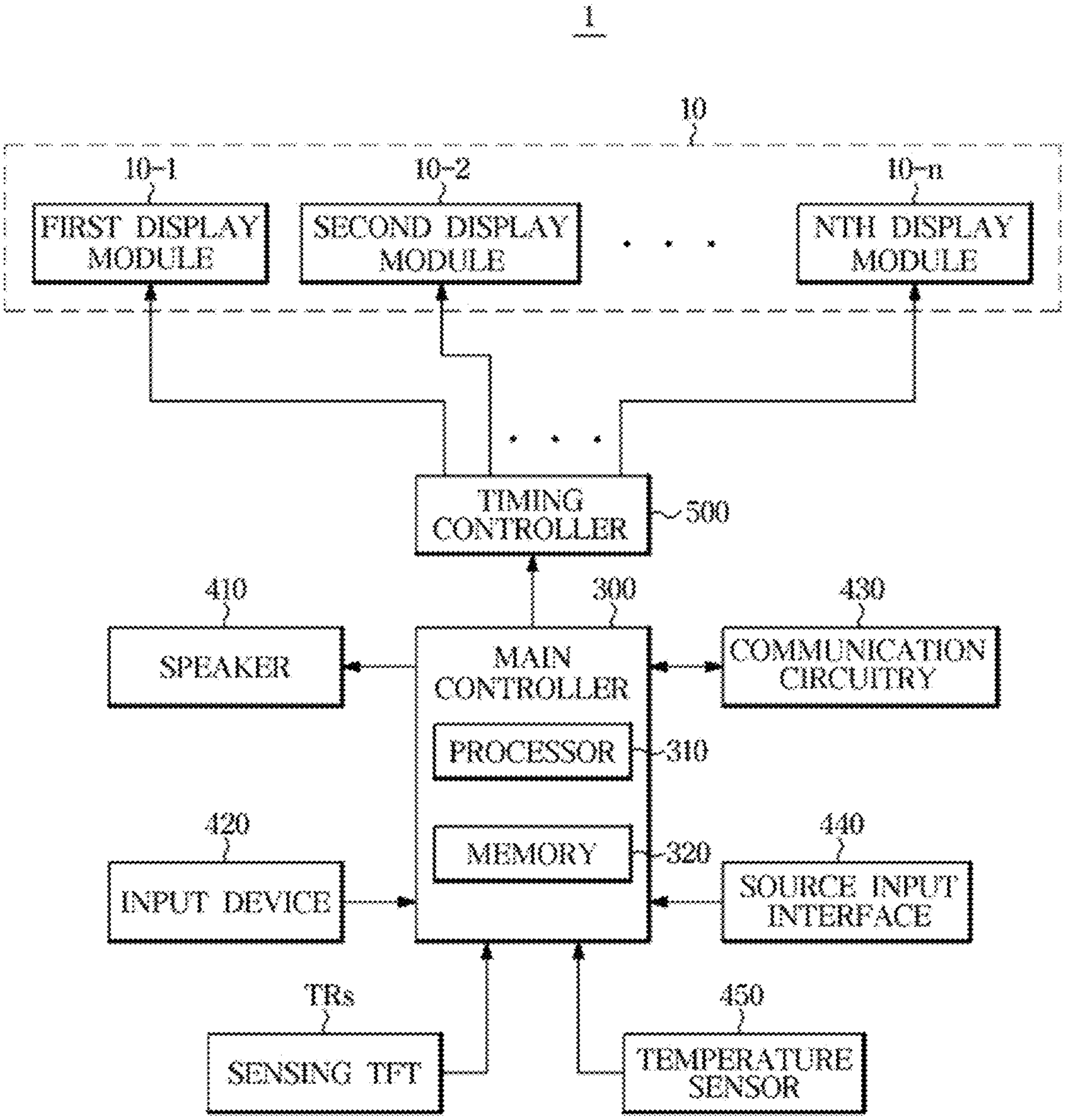
FIG. 3 is a block diagram illustrating a display apparatus according to an embodiment.

FIG. 3 is a block diagram illustrating a display apparatus according to an embodiment.

As illustrated in FIG. 1 above, the display apparatus 1 according to an embodiment may include a plurality of display modules 10 including a display module 10-1, a display module 10-2, . . . and a display module **10-*n* (n is an integer greater than or equal to two), a main controller 300 and a timing controller 500 which control the plurality of display modules 10, communication circuitry 430 which communicates with an external device, a source input interface 440 which receives a source image, a speaker 410 which outputs a sound, and an input device 420 which receives a command for controlling the display apparatus 1** from a user.

The input device 420 may also include a button or a touch pad provided in one area of the display apparatus 1, and in a case in which the display apparatus 1 is implemented using a touch screen, the input device 420 may include the touch pad provided on a front surface of the display apparatus 1. In addition, the input device 420 may also include a remote controller.

The input device 420 may receive various commands for controlling the display apparatus 1 from a user to perform power on/off, volume adjustment, channel adjustment, screen adjustment, various setting changes, and the like of the display apparatus 1.

The speaker 410 may be provided in one area of a main body 20 of the display apparatus 1, and a speaker module physically separated from the main body 20 may be additionally or alternatively provided.

The communication circuitry 430 may communicate with a relay server or other electronic devices to transmit and receive relevant data. The communication circuitry 430 may use at least one of various wireless communication methods such as 3rd Generation (3G), 4th Generation (4G), wireless local area net (LAN), Wi-Fi, Bluetooth, Zigbee, Wi-Fi Direct (WFD), ultra-wideband (UWB), Infrared Data Association (IrDA), Bluetooth Low Energy (BLE), near field communication (NFC), and Z-Wave. In addition, the communication circuitry 430 may also use a wired communication method such as Peripheral Component Interconnect (PCI), PCI-express, or Universe Serial Bus (USB).

The source input interface 440 may receive a source signal input from a set-top box, a USB, an antenna, or the like. Accordingly, the source input interface 440 may include at least one selected from a source input interface group consisting of a High-Definition Multimedia Interface (HDMI) cable port, a USB port, an antenna port, and the like.

The source signal received by the source input interface 440 may be processed by the main controller 300 and converted into the form capable of being output from the display panel 100 (see FIG. 4) and the speaker 410.

The main controller 300 and the timing controller 500 may include at least one memory 320 which stores a program for performing an operation, which will be described below, and various pieces of data and at least one processor 310 configured to execute the stored program.

The main controller 300 may process a source signal input through the source input interface 440 to generate an image signal corresponding to the input source signal.

For example, the main controller 300 may include a source decoder, a scaler, an image enhancer, and a graphic processor. The source decoder may decode a source signal compressed in a format such as Moving Picture Experts Group (MPEG) and the like, and the scaler may output image data of a desired resolution through resolution conversion.

The image enhancer may improve image quality of image data by applying various compensation techniques. The graphic processor may divide pixels of image data into red-green-blue (RGB) data to output together with a control signal, such as a syncing signal, for a display timing at the display panel 100. That is, the main controller 300 may output image data and a control signal which corresponds to a source signal.

The above-described operation of the main controller 300 is only an example applicable to the display apparatus 1, other operations may be further performed, and some operations among the above-described operations may be omitted.

The image data and the control signal output from the main controller 300 may be transmitted to the timing controller 500.

The timing controller 500 may generate various control signals such as a timing control signal for converting the image data transmitted from the main controller 300 to image data having the form that may be processed in a driver integrated circuit (IC) 200 (see FIG. 4) and displaying the image data on the display panel 100.

As will be described below, the main controller 300 may receive a detection result from a sensing thin film transistor (TFT, $TR_S$) that is included in each of a plurality of pixel circuits 110 and detects current flowing through the plurality of pixel circuits 110, may receive a detection result from a temperature sensor 450 that is provided on a substrate 130 and detects the temperature of the substrate 130, and may perform control based on the detection results.

Figure 4:
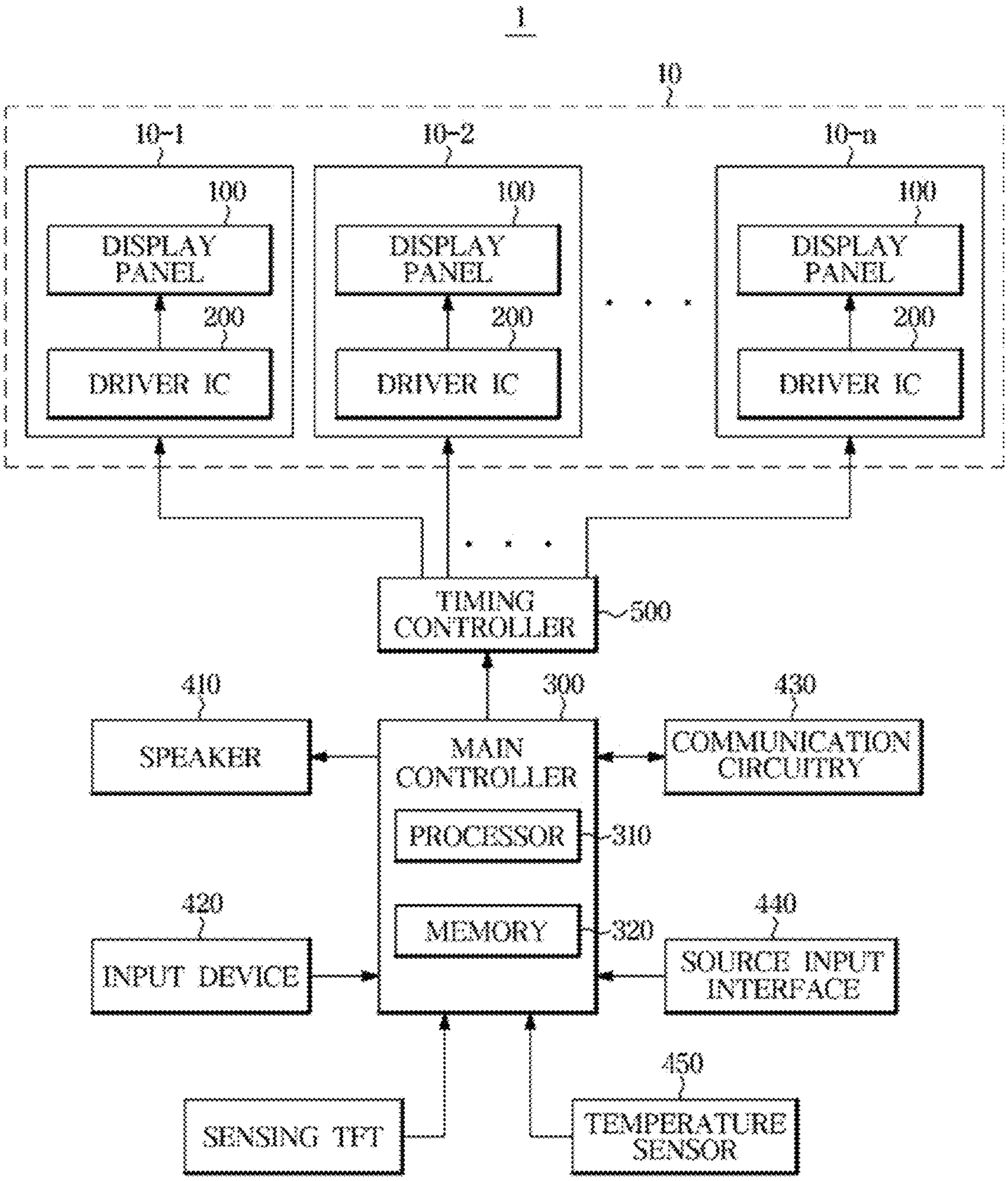
FIG. 4 is a detailed block diagram illustrating a configuration of a display module included in a display apparatus according to an embodiment.
Figure 5:
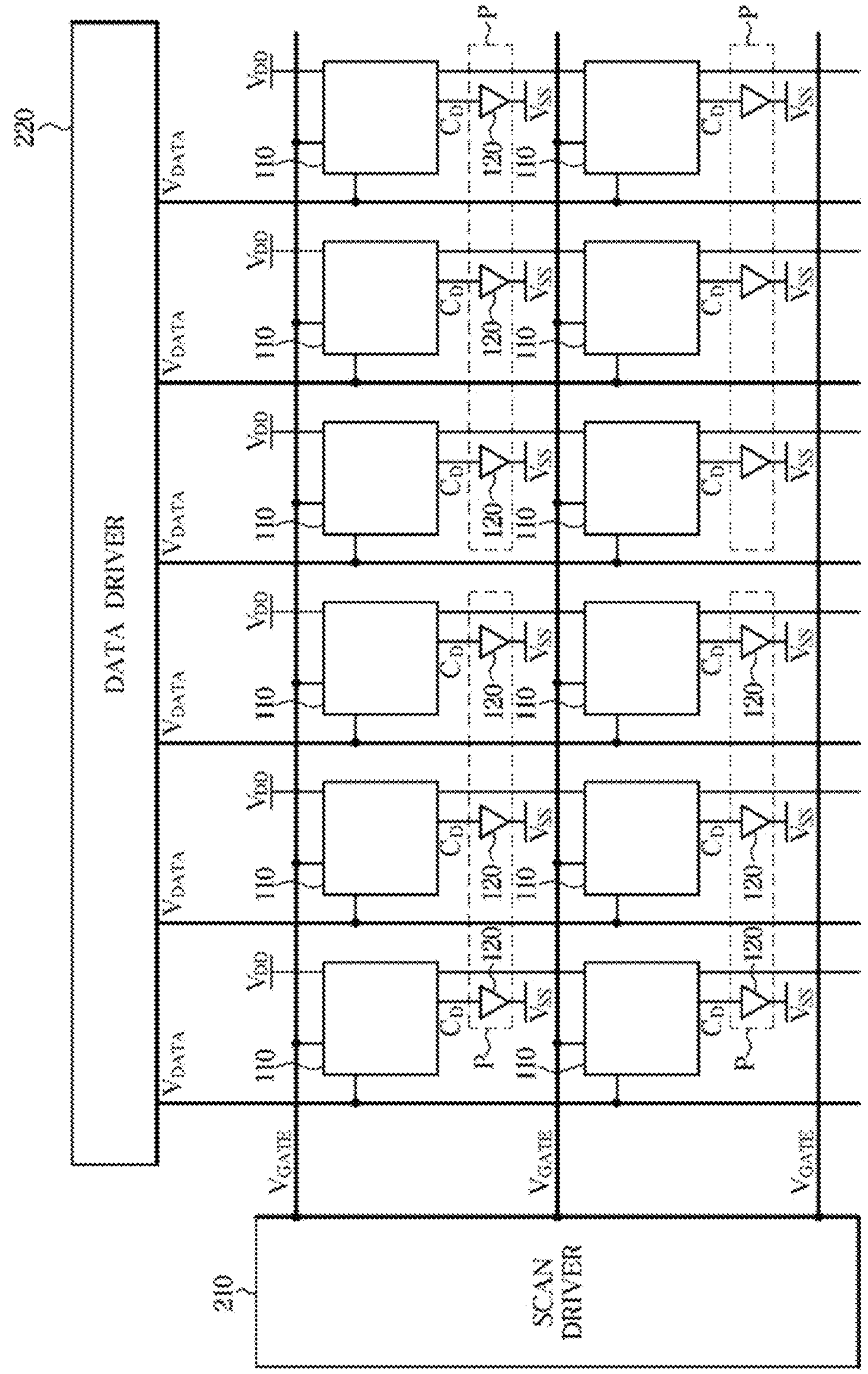
FIG. 5 is a diagram for conceptually describing a method in which each pixel is driven in a display module according to an embodiment.

FIG. 4 is a detailed block diagram illustrating a configuration of a display module included in a display apparatus according to an embodiment, and FIG. 5 is a diagram for conceptually describing a method in which each pixel is driven in a display module according to an embodiment.

Referring to FIG. 4, the plurality of display modules 10-1, 10-2 . . . and **10-*n* may each include the display panel 100 displaying an image and the driver IC 200 driving the display panel 100**.

The driver IC 200 may generate a driving signal for the display panel 100 to display an image based on image data and a timing control signal transmitted from the timing controller 500.

The driving signal generated by the driver IC 200 may include a gate signal and a data signal, and the generated driving signal is input to the display panel 100.

As described above, the display apparatus 1 according to the embodiment is a self-luminous display apparatus. Accordingly, a light emitting device 120 emitting red, green, or blue light may be disposed in each of the sub-pixels.

The light emitting device 120 disposed in each subpixel may be driven in an active matrix (AM) or passive matrix (PM) manner.

Referring to FIG. 5, the driver IC 200 may include a scan driver 210 and a data driver 220. The scan driver 210 may output a gate signal for turning on/off the subpixel, and the data driver 220 may output a data signal for implementing an image.

The scan driver 210 may generate a gate signal based on a timing control signal transmitted from the timing controller 500, and the data driver 220 may generate a data signal based on image data transmitted from the timing controller 500.

The display module 10 may include a pixel circuit 110 for individually controlling each light emitting device 120, and the gate signal output from the scan driver 210 and the data signal output from the data driver 220 may be input to the pixel circuit 110.

For example, when a gate voltage VGATE, a data voltage VDATA, and a power voltage VDD are input to the pixel circuit 110, the pixel circuit 110 may generate a driving current CD for driving the light emitting device 120.

The driving current CD output from the pixel circuit 110 may be input to the light emitting device 120, and the light emitting device 120 may emit light by the input driving current CD to implement an image.

Figure 6:
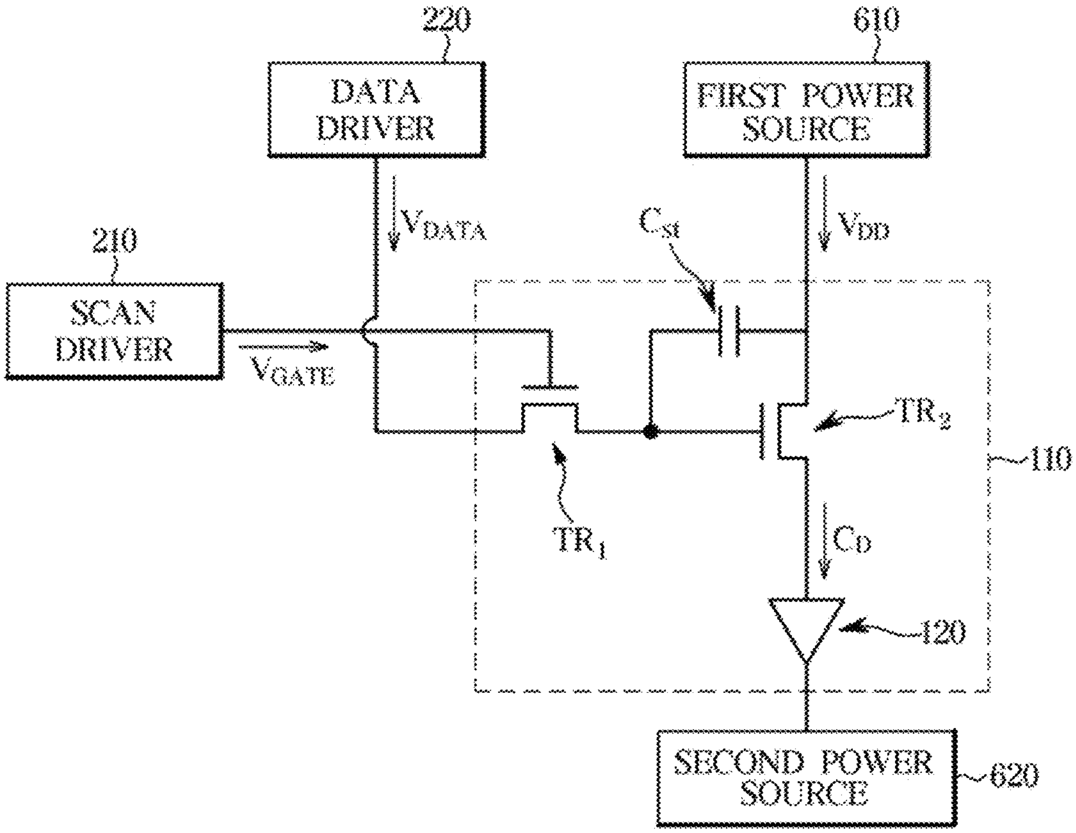
FIG. 6 is a circuit diagram schematically illustrating a pixel circuit for controlling a single subpixel in a display module according to an embodiment.

FIG. 6 is a circuit diagram schematically illustrating a pixel circuit for controlling a single subpixel in a display module according to an embodiment.

Referring to the example of FIG. 6, the pixel circuit 110 may include thin film transistors TR1 and TR2 for switching or driving the light emitting device 120 and a capacitor Cst.

For example, the thin film transistors TR1 and TR2 may include a switching transistor TR1 and a driving transistor TR2, and the switching transistor TR1 and the driving transistor TR2 may be implemented as P-channel metal-oxide-semiconductor (PMOS) transistors. However, embodiments of the display module 10 and the display apparatus1 1 are not limited thereto, and the switching transistor TR1 and the driving transistor TR2 may be implemented as N-channel metal-oxide-semiconductor (NMOS) transistors.

In addition, the thin film transistors TR1 and TR2 may be low temperature polycrystalline silicon (LTPS) thin film transistors or oxide thin film transistors. In addition, the thin film transistors TR1 and TR2 may be amorphous silicon (a-Si) thin film transistors or single crystal thin film transistors.

The switching transistor TR1 has a gate electrode connected to the scan driver 210, a source electrode connected to the data driver 220, and a drain electrode connected to one end of the capacitor CST and a gate electrode of the driving transistor TR2. The other end of the capacitor CST may be connected to a first power source 610.

In addition, the driving transistor TR2 has a source electrode connected to the first power source 610 for supplying a power voltage VDD and a drain electrode connected to an anode of the light-emitting device 120.

The light-emitting device 120 has a cathode connected to a second power source 620 for supplying a reference voltage VSS. The reference voltage VSS may be a voltage lower than the power voltage VDD, and a ground voltage or the like may be used as the reference voltage VSS to provide the ground.

The pixel circuit 110 of the above-described structure may operate as described below. First, when the gate voltage VGATE is applied from the scan driver 210 to turn the switching transistor TR1 on, the data voltage VDATA applied from the data driver 220 may be transmitted to one end of the capacitor CST and the gate electrode of the driving transistor TR2.

A voltage corresponding to a gate-source voltage of the driving transistor TR2 may be maintained for a predetermined time due to the capacitor CST. The driving transistor TR2 may apply a driving current CD corresponding to the gate-source voltage to the anode of the light-emitting device 120, thereby causing the light-emitting device 120 to emit light.

However, the above-described structure of the pixel circuit 110 is merely an example applicable to the display module 10 according to one embodiment, and various circuit structures for switching and driving the plurality of light-emitting devices 120 may be applied to the display module 10 in addition to the above example.

Further, in this embodiment, a brightness control method of the light-emitting device 120 is not limited. The brightness of the light-emitting device 120 may be controlled by one of various methods, such as a pulse amplitude modulation (PAM) method, a pulse width modulation (PWM) method, and a hybrid method combining the PAM method and the PWM method, and the structure of the pixel circuit 110 may also vary according to the brightness control method.

The overall structure and operation of the pixel circuit 110 have been described above. Hereinafter, operations for sensing current within such pixel circuit 110 will be described.

Figure 7:
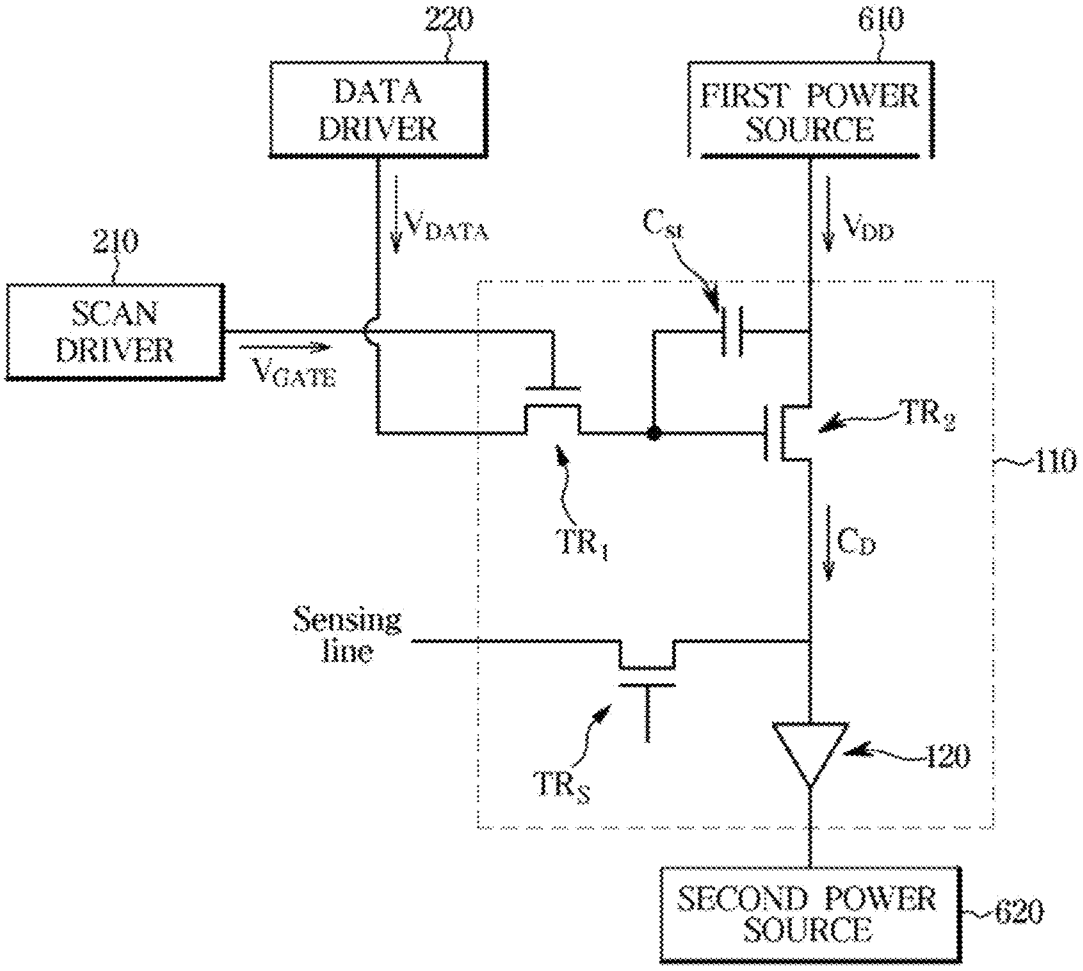
FIG. 7 is a diagram illustrating a sensing thin film transistor (TFT) that detects current flowing through a pixel circuit according to an embodiment.
Figure 8:
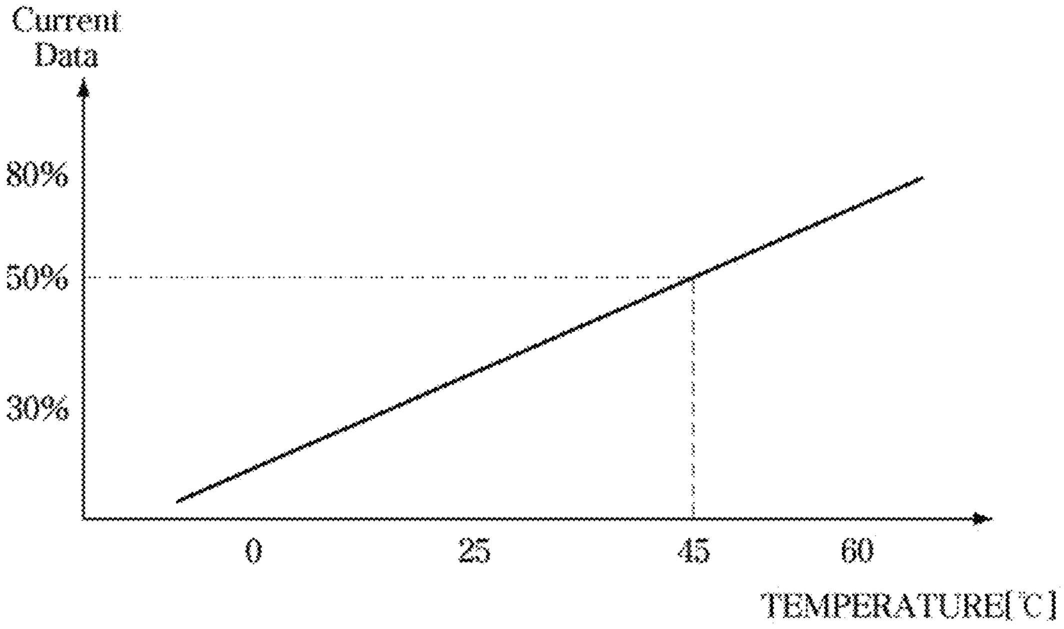
FIG. 8 is a diagram illustrating a correlation between current detected by a sensing TFT and a temperature of a display panel according to an embodiment.

FIG. 7 is a diagram illustrating a sensing TFT that detects current flowing through a pixel circuit according to an embodiment, and FIG. 8 is a diagram illustrating a correlation between current detected by a sensing TFT and temperature of a display panel according to an embodiment.

The plurality of pixel circuits 110 may each further include a sensing TFT ($TR_s$) that detects currents flowing through the plurality of pixel circuits 110.

The sensing TFT ($TR_s$) may be connected to an anode terminal of the LED 120 to detect (sense) the driving current.

The sensing TFT ($TR_s$) may be arranged to be turned on while sensing the driving current. Accordingly, while sensing the driving current, the driving current may flow from the driving line to the sensing line.

The memory 320 may store a look-up table for currents flowing through the plurality of pixel circuits 110 and temperatures of the display panel 100. Here, the temperature of the display panel 100, e.g., a first temperature of the display panel 100, may include the surface temperature of the display panel 100.

For example, the memory may store a look-up table indicating a correlation in which, for example, the temperature of the display panel 100 is 45° C. when the current data detected by the sensing TFT ($TR_s$) is 50%.

Information about such correlation between currents flowing through the plurality of pixel circuits 110 and temperatures of the display panel 100 may be set during the design process, and may be stored in the memory 320.

That is, when the current data detected by the sensing TFT ($TR_s$) is 50%, the at least one processor 310 may determine that the temperature of the display panel 100 is 45° C. according to the look-up table stored in the memory 320.

As such, the temperature of the display panel 100 may be determined based on the current data detected by the sensing TFT ($TR_s$), and when the determined temperature is equal to or greater than a predetermined temperature, luminance may be reduced to reduce the temperature of the display panel 100.

FIG. 9 is a diagram illustrating errors with respect to an operating time of a display apparatus according to an embodiment.

As described above, in determining a temperature of the display panel 100 based on current data detected by the sensing TFT ($TR_s$), in a case where an operating time of the display apparatus 1 is significantly long and the sensing TFT ($TR_s$) deteriorates, higher current data than the actual current may be detected. Accordingly, a temperature higher than the actual temperature of the display panel 100 may be determined as the temperature of the display panel 100. As a result, even though the actual temperature of the display panel 100 is not sufficiently high, luminance reduction control may be performed, causing user inconvenience.

That is, as shown in FIG. 9, in a case where the operating time of the display apparatus 1 is 144 hours, it may be confirmed that the difference between the actual temperature of the display panel 100 and the temperature corresponding to the current data detected by the sensing TFT ($TR_s$) based on the look-up table is approximately −0.70 [° C.]. Also, in a case where the operating time of the display apparatus 1 is 300 hours, it may be confirmed that the difference between the actual temperature of the display panel 100 and the temperature corresponding to the current data detected by the sensing TFT ($TR_s$) based on the look-up table is 0.00 [° C.]. That is, when the operating time of the display apparatus 1 is not long, the temperature of the display panel 100 determined based on the current data detected by the TFT ($TR_s$) and the look-up table is similar to the actual temperature, and thus the temperature of the display panel 100 determined based on the current data detected by the TFT ($TR_s$) and the look-up table may be determined as a final temperature of the display panel (100).

However, in a case where the operating time of the display apparatus 1 is 2000 hours, it may be confirmed that the difference between the actual temperature of the display panel 100 and the temperature corresponding to the current data detected by the sensing TFT ($TR_s$) based on the look-up table is approximately 3.96 [° C.], and in a case where the operating time of the display apparatus 1 is 3000 hours, the difference between the actual temperature of the display panel 100 and the temperature corresponding to the current data detected by the sensing TFT ($TR_s$) based on the look-up table is approximately 7.40 [° C.]. In addition, in a case where the operating time of the display apparatus 1 is 10000 hours, it may be confirmed that the difference between the actual temperature of the display panel 100 and the temperature corresponding to the current data detected by the sensing TFT ($TR_s$) based on the look-up table is approximately 10.50 [° C.]. That is, as the operating time of the display apparatus 1 increases, the sensing TFT ($TR_s$) deteriorates and becomes unable to accurately detect current. As a result, a difference occurs between the temperature determined based on the look-up table and the actual temperature.

Accordingly, the disclosure additionally provides the temperature sensor 450 to reduce temperature errors (temperature difference) of the display panel 100, in addition to the temperature corresponding to the current detected by the sensing TFT ($TR_s$) based on the look-up table stored in the memory.

Specifically, when a difference between the temperature corresponding to the current detected by the sensing TFT ($TR_s$) based on the look-up table and the temperature detected by the temperature sensor 450 is less than a predetermined temperature, the temperature corresponding to the current detected by the sensing TFT ($TR_s$) based on the look-up table may be used as the final temperature, because the error is insignificant.

Conversely, when a difference between the temperature corresponding to the current detected by the sensing TFT ($TR_s$) based on the look-up table and the temperature detected by the temperature sensor 450 is equal to or greater than a predetermined temperature, the final temperature of the display panel 100 may be determined by reflecting the temperature detected by the temperature sensor 450 because the sensing TFT ($TR_s$) may have deteriorated and a difference from the actual temperature occurs, which will be described in detail below.

Figure 10:
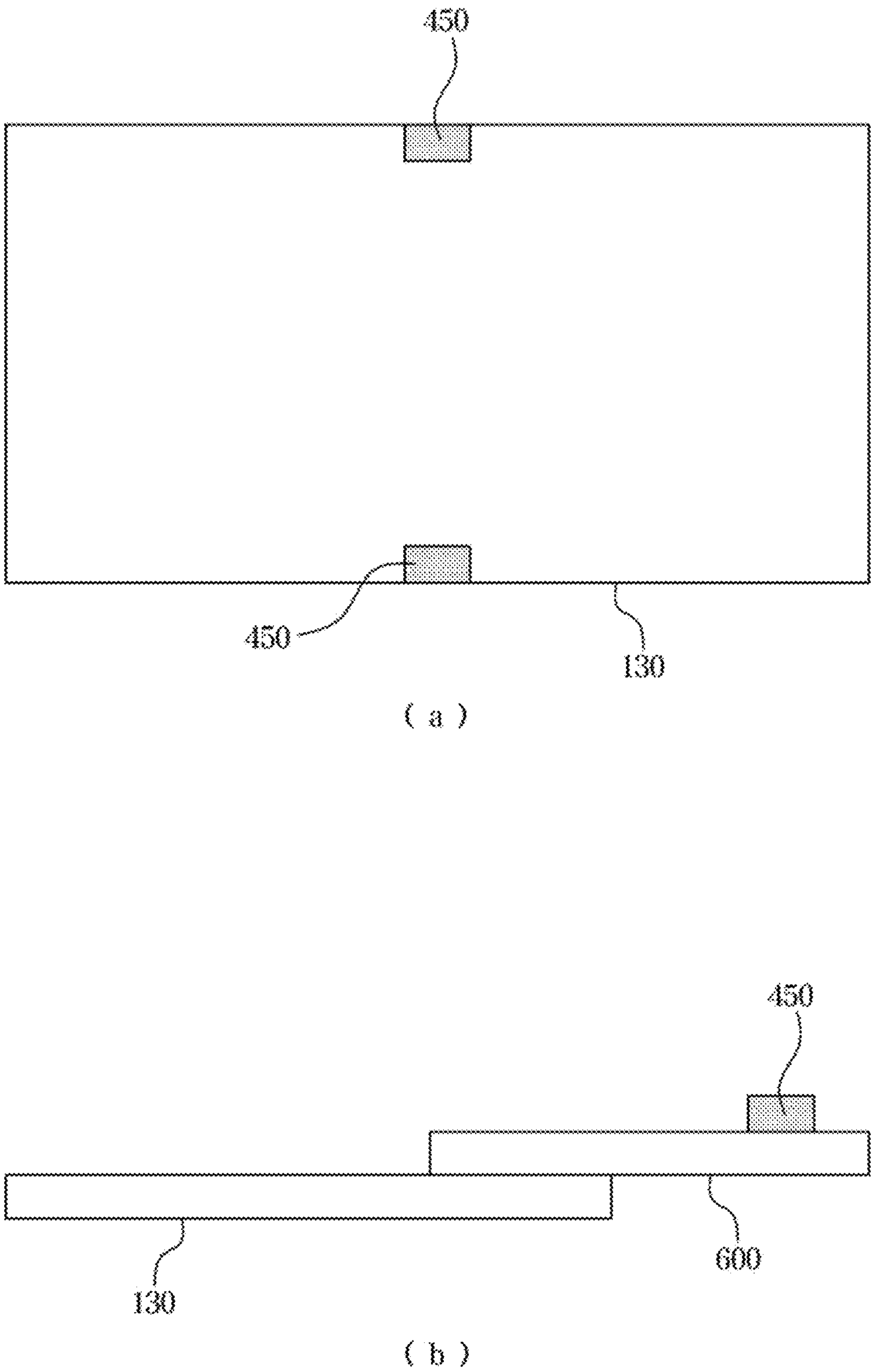
FIG. 10 is a diagram illustrating an arrangement of temperature sensors according to an embodiment.

FIG. 10 is a diagram illustrating an arrangement of temperature sensors according to an embodiment.

As described above, the display apparatus 1 may further include the temperature sensor 450 to reduce an error (temperature difference) with the actual temperature of the display panel 100.

The temperature sensor 450 may be provided on the substrate 130 to detect a temperature of the substrate 130. The temperature sensor 450 may be provided to reduce errors when the temperature based on the sensing TFT ($TR_s$) and look-up table is inaccurate. For example, the temperature sensor 450 may be disposed at a position in the edge region of the substrate 130 as shown in FIG. 10(*a*). Because many heat source elements are not arranged in the edge region of the substrate 130 and the temperature sensor 450 may be less affected by external influences, the temperature sensor 450 may be provided in the edge region of the substrate 130 to detect a temperature close to the actual temperature of the display panel 100. At least one or more temperature sensor 450 may be disposed on the substrate 130.

In another embodiment, as shown in FIG. 10(*b*), the temperature sensor 450 may be provided on a Source-Printed Circuit Board (S-PCB, 600) connected to the substrate 130 to transmit data received from external devices and the like. FIG. 10(*b*) shows the structure of the substrate 130 and S-PCB 600 viewed from the side. Because the S-PCB 600 is also connected to the end portion of the substrate 130, the S-PCB 600 may be less affected by external influences, and may therefore detect a temperature close to the actual temperature of the display panel 100.

Hereinafter, operations for determining the final temperature of the display panel 100 based on the temperature detected by the temperature sensor 450 and the temperature corresponding to the current detected by the sensing TFT ($TR_s$) in the look-up table stored in the memory will be described.

Figure 11:
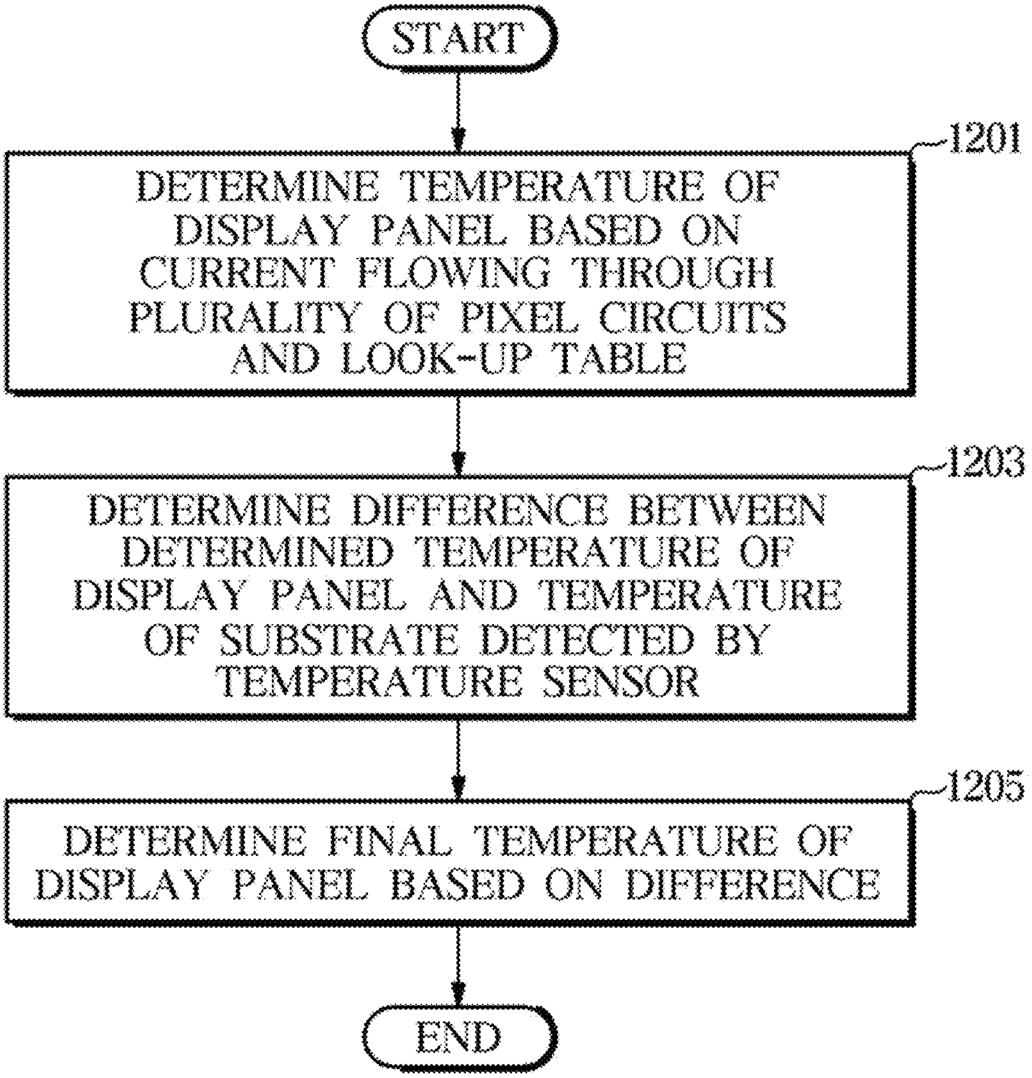
FIG. 11 is a flowchart illustrating a control method of a display apparatus according to an embodiment.

FIG. 11 is a flowchart illustrating a control method of a display apparatus according to an embodiment.

The at least one processor 310 may determine a temperature of the display panel 100 based on currents, which flow through the plurality of pixel circuits 110 and are detected by the sensing TFT ($TR_s$), and the look-up table stored in the memory 320 (1201).

The at least one processor 310 may receive temperature information of the substrate 130 detected by the temperature sensor 450, and determine a difference between the determined temperature of the display panel 100 and a temperature of the substrate 130 detected by the temperature sensor 450 (1203).

The at least one processor 310 may determine a final temperature of the display panel 100 based on the difference (1205).

Subsequently, the at least one processor 310 may perform luminance control to reduce a brightness of light emitted from the pixel circuits 110, based on the determined final temperature of the display panel 100 being equal to or greater than a reference temperature. Here, the reference temperature is a value set to prevent excessive temperature rise of the display panel 100, and may be 45[° C.], for example.

Details about determining the final temperature of the display panel 100 based on the difference between the determined temperature of the display panel 100 and the temperature of the substrate 130 detected by the temperature sensor 450 will be described below.

Figure 12:
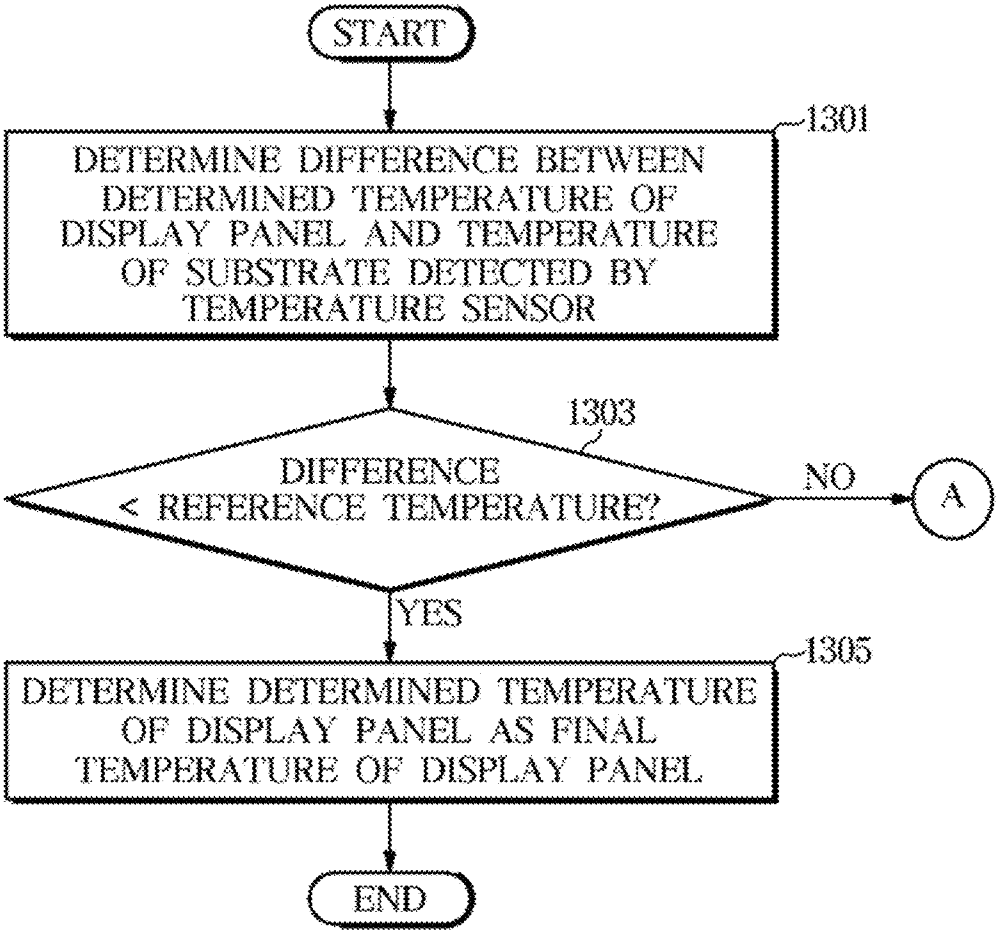
FIG. 12 is a flowchart illustrating a control method of a display apparatus according to an embodiment.
Figure 13:
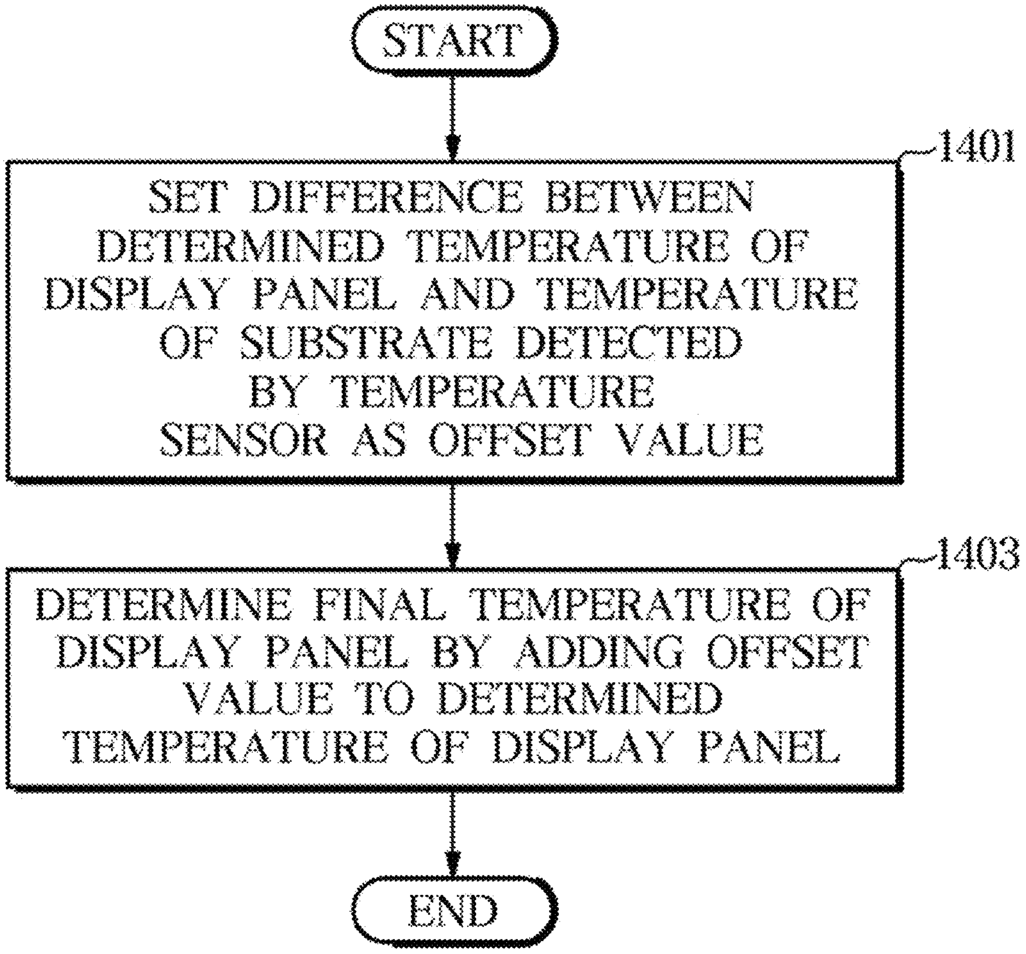
FIG. 13 is a flowchart illustrating a control method of a display apparatus according.

FIG. 12 and FIG. 13 are flowcharts illustrating a control method of a display apparatus according to an embodiment in more detail, and FIG. 14 is a diagram illustrating errors reflecting temperature sensor detection results according to an embodiment.

When the difference between the temperature of the display panel 100 determined based on currents flowing through the plurality of pixel circuits 110 and the look-up table stored in the memory 320 and the temperature of the substrate 130 detected by the temperature sensor 450 is less than the reference temperature (YES in operation 1303), the at least one processor 310 may determine the temperature of the display panel 100 determined based on currents flowing through the plurality of pixel circuits 110 and the look-up table stored in the memory 320, as the final temperature of the display panel 100 (1303). Here, the reference temperature is a value set to determine whether the sensing TFT ($TR_s$) has deteriorated, and may be 3 [° C.], for example.

That is, as the operating time of the display apparatus 1 is not long and the sensing TFT ($TR_s$) has not deteriorated, currents flowing through the pixel circuits 110 may be accurately detected and the temperature of the display panel 100 may be more accurately determined. Therefore, when the difference between the temperature of the display panel 100 determined based on currents flowing through the plurality of pixel circuits 110 and the look-up table stored in the memory 320 and the temperature of the substrate 130 detected by the temperature sensor 450 is less than the reference temperature, the temperature of the display panel 100 determined based on currents flowing through the plurality of pixel circuits 110 and the look-up table stored in the memory 320 may be determined as the final temperature of the display panel 100.

When the difference between the temperature of the display panel 100 determined based on currents flowing through the plurality of pixel circuits 110 and the look-up table stored in the memory 320 and the temperature of the substrate 130 detected by the temperature sensor 450 is equal to or greater than the reference temperature (NO in operation 1303), the at least one processor 310 may set the difference between the determined temperature of the display panel 100 and the temperature of the substrate 130 detected by the temperature sensor 450 as an offset value (1401), and may determine the final temperature of the display panel 100 by adding the offset value to the determined temperature of the display panel 100 (1403).

For example, in a case where the temperature sensor 450 is positioned at the edge region of the substrate 130 to detect a temperature of the edge region of the substrate 130, the at least one processor 310 may determine a temperature at the edge region of the display panel 100 based on the look-up table and currents flowing through pixel circuit 110 positioned corresponding to the location of the temperature sensor 450 among the plurality of pixel circuits 110. That is, the temperature at the edge of the display panel 100 may be determined based on the look-up table and currents flowing through the pixel circuit 110 located in the edge region of the substrate 130 and positioned around the temperature sensor 450.

When the difference between the determined temperature at the edge of the display panel 100 and the temperature of the edge region of the substrate 130 detected by the temperature sensor 450 is equal to or greater than the reference temperature, the at least one processor 310 may set the difference between the determined temperature at the edge of the display panel 100 and the temperature at the edge region of the substrate 130 detected by the temperature sensor 450 as the offset value.

The at least one processor 310 may determine the final temperature of the display panel 100 by adding the offset value to the temperature of the display panel 100 determined based on the look-up table and currents flowing through pixel circuits 110.

That is, the offset value may be set based on the difference between the temperature value based on currents flowing through pixel circuits 110 located around the temperature sensor 450 and the temperature detected by the temperature sensor 450, and the final temperature of the display panel 100 may be determined by adding the offset value to the temperature based on current values flowing through each of all pixel circuits 110 of the display apparatus 1.

As described above, the final temperature of the display panel 100 may be determined by reflecting detection result of the temperature sensor 450, and thus it may be confirmed that significant errors do not occur even when the operating time of the display apparatus 1 increases, as shown in FIG. 14.

That is, in a case where the operating time of the display apparatus 1 is 2000 hours, it may be confirmed that the previous error of 3.96 [° C.] is reduced to 2.23 [° C.] by reflecting the detection result of the temperature sensor 450. In addition, in a case where the operating time of the display apparatus 1 is 3000 hours, it may be confirmed that the previous error of 7.40 [° C.] is reduced to 1.67 [° C.] by reflecting the detection result of the temperature sensor 450.

In a case where the operating time of the display apparatus 1 is 10000 hours, the previous error of 10.50 [° C.] is reduced to 0.74 [° C.] by reflecting the detection result of the temperature sensor 450.

As such, temperature errors due to deterioration of the sensing TFT may be reduced by reflecting the detection result of the temperature sensor separately provided on the substrate, as well as the temperature of the display panel corresponding to the current detected by the sensing TFT flowing through the pixel circuits based on the look-up table. Accordingly, the temperature of the display panel may be detected more accurately. In addition, excellent image quality characteristics, such as luminance and lifespan, may be secured by detecting the temperature of display panel with low errors and performing luminance reduction control.

A display apparatus according to an embodiment may include: a display panel including a substrate, a plurality of pixel circuits provided on the substrate, and a sensing thin film transistor (TFT) configured to detect a current flowing through the plurality of pixel circuits; a temperature sensor provided on the substrate and configured to detect a temperature of the substrate; a memory configured to store a look-up table relating the current flowing through the plurality of pixel circuits to a temperature of the display panel; and at least one processor configured to: determine the temperature of the display panel based on the current flowing through the plurality of pixel circuits and the look-up table, determine a final temperature of the display panel based on a difference between the determined temperature of the display panel and the temperature of the substrate detected by the temperature sensor.

According to the disclosure, a temperature of a display panel may be more accurately detected by reducing temperature errors due to deterioration of a sensing TFT by reflecting a detection result of a temperature sensor separately provided on a substrate as well as the display panel temperature corresponding to a current flowing through a pixel circuit as detected by the sensing TFT based on a look-up table.

In addition, excellent image quality characteristics such as luminance and lifetime may be secured by detecting the temperature of the display panel with low errors and performing luminance reduction control The at least one processor may be configured to set the difference between the determined temperature of the display panel and the temperature of the substrate detected by the temperature sensor as an offset value, based on the difference being equal to or greater than a reference temperature.

The at least one processor may be configured to determine the final temperature of the display panel by adding the offset value to the determined temperature of the display panel.

The at least one processor may be configured to determine the determined temperature of the display panel as the final temperature of the display panel, based on the difference between the determined temperature of the display panel and the temperature of the substrate detected by the temperature sensor being less than a reference temperature.

The at least one processor may be configured to perform luminance control for reducing a brightness of light emitted from the plurality of pixel circuits, based on the final temperature of the display panel being equal to or greater than a reference temperature.

The temperature sensor may be disposed in an edge region of the substrate to detect a temperature of the edge region of the substrate, and the at least one processor may be configured to: determine a temperature at an edge region of the display panel based on the look-up table and a current flowing through a pixel circuit corresponding to a position of the temperature sensor from among the plurality of pixel circuits, and determine the final temperature of the display panel based on a difference between the determined temperature at the edge region of the display panel and the temperature at the edge region of the substrate detected by the temperature sensor.

The at least one processor may be configured to set the difference between the determined temperature at the edge region of the display panel and the temperature at the edge region of the substrate as an offset value, based on the difference being equal to or greater than a reference temperature, and determine the final temperature of the display panel by adding the offset value to the temperature of the display panel determined based on the look-up table and the current flowing through the plurality of pixel circuits.

According to an embodiment of the disclosure, in a method for controlling a display apparatus which includes display panel including a substrate, a plurality of pixel circuits provided on the substrate, and a sensing thin film transistor (TFT) configured to detect a current flowing through the plurality of pixel circuits, a temperature sensor provided on the substrate and configured to detect a temperature of the substrate, and a memory configured to store a look-up table relating the current flowing through the plurality of pixel circuits to a temperature of the display panel, the method may include: determining the temperature of the display panel based on the current flowing through the plurality of pixel circuits and the look-up table; and determining a final temperature of the display panel based on a difference between the determined temperature of the display panel and the temperature of the substrate detected by the temperature sensor.

The determining of the final temperature of the display panel may include setting the difference between the determined temperature of the display panel and the temperature of the substrate detected by the temperature sensor as an offset value, based on the difference being equal to or greater than a reference temperature.

The determining of the final temperature of the display panel may include determining the final temperature of the display panel by adding the offset value to the determined temperature of the display panel.

The determining of the final temperature of the display panel may include determining the determined temperature of the display panel as the final temperature of the display panel, based on the difference between the determined temperature of the display panel and the temperature of the substrate detected by the temperature sensor being less than a reference temperature.

The method may further include performing luminance control for reducing a brightness of light emitted from the plurality of pixel circuits, based on the final temperature of the display panel being equal to or greater than a reference temperature.

The detecting of the temperature of the substrate may include detecting a temperature of an edge region of the substrate.

The determining of the final temperature of the display panel may include determining a temperature at an edge region of the display panel based on the look-up table and a current flowing through a pixel circuit corresponding to a position of the temperature sensor from among the plurality of pixel circuits; and determining the final temperature of the display panel based on a difference between the determined temperature at the edge region of the display panel and the temperature at the edge region of the substrate detected by the temperature sensor.

The determining of the final temperature of the display panel may include setting the difference between the determined temperature at the edge region of the display panel and the temperature at the edge region of the substrate detected by the temperature sensor as an offset value, based on the difference being equal to or greater than a reference temperature; and determining the final temperature of the display panel by adding the offset value to the temperature of the display panel determined based on the look-up table and the current flowing through the plurality of pixel circuits.

According to the disclosure, a temperature of a display panel may be more accurately detected by reducing temperature errors due to deterioration of a sensing TFT by reflecting a detection result of a temperature sensor separately provided on a substrate as well as the display panel temperature corresponding to a current flowing through a pixel circuit as detected by the sensing TFT based on a look-up table.

In addition, excellent image quality characteristics such as luminance and lifetime may be secured by detecting the temperature of the display panel with low errors and performing luminance reduction control.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the present disclosure. Thus, it should be understood that the disclosed embodiments described above are merely for illustrative purposes and not for limitation purposes in all aspects.

What is claimed is:

1. A display apparatus comprising:
- a display panel comprising a substrate, a plurality of pixel circuits disposed on the substrate, and at least one sensing thin film transistor (TFT) configured to detect a current flowing through the plurality of pixel circuits;
- a temperature sensor disposed on the substrate and configured to detect a temperature of the substrate;
- memory configured to store a look-up table relating the current flowing through the plurality of pixel circuits to a first temperature of the display panel; and
- at least one processor configured to:
  - determine the first temperature of the display panel based on the current flowing through the plurality of pixel circuits and the look-up table,
  - determine a final temperature of the display panel based on a difference between the determined first temperature of the display panel and the temperature of the substrate detected by the temperature sensor.

2. The display apparatus of claim 1, wherein the at least one processor is further configured to set the difference between the determined first temperature of the display panel and the temperature of the substrate detected by the temperature sensor as an offset value, based on the difference being equal to or greater than a reference temperature.

3. The display apparatus of claim 2, wherein the at least one processor is further configured to determine the final temperature of the display panel by adding the offset value to the determined first temperature of the display panel.

4. The display apparatus of claim 1, wherein the at least one processor is further configured to determine the determined temperature of the display panel as the final temperature of the display panel, based on the difference between the determined temperature of the display panel and the temperature of the substrate detected by the temperature sensor being less than a reference temperature.

5. The display apparatus of claim 1, wherein the at least one processor is further configured to perform luminance control for reducing a brightness of light emitted from the plurality of pixel circuits, based on the final temperature of the display panel being equal to or greater than a reference temperature.

6. The display apparatus of claim 1,
- wherein the temperature sensor is disposed at a position in an edge region of the substrate to detect a temperature of the edge region of the substrate, and
- the at least one processor is further configured to:
  - determine a temperature at an edge region of the display panel based on the look-up table and a current flowing through a pixel circuit corresponding to the position of the temperature sensor from among the plurality of pixel circuits,
- wherein the difference between the determined temperature of the display panel and the temperature of the substrate detected by the temperature sensor comprises a difference between the determined temperature at the edge region of the display panel and the temperature at the edge region of the substrate detected by the temperature sensor.

7. The display apparatus of claim 6,
- wherein the at least one processor is further configured to:
- set the difference between the determined temperature at the edge region of the display panel and the temperature at the edge region of the substrate as an offset value, based on the difference between the determined temperature at the edge region of the display panel and the temperature at the edge region of the substrate being equal to or greater than a reference temperature, and
- determine the final temperature of the display panel by adding the offset value to the temperature of the display panel determined based on the look-up table and the current flowing through the plurality of pixel circuits.

8. A method for controlling a display apparatus comprising a display panel comprising a substrate, a plurality of pixel circuits disposed on the substrate, and at least one sensing thin film transistor (TFT) configured to detect a current flowing through the plurality of pixel circuits, a temperature sensor disposed on the substrate and configured to detect a temperature of the substrate, and a memory configured to store a look-up table relating the current flowing through the plurality of pixel circuits to a first temperature of the display panel, the method comprising:

determining the first temperature of the display panel based on the current flowing through the plurality of pixel circuits and the look-up table; and determining a final temperature of the display panel based on a difference between the determined first temperature of the display panel and the temperature of the substrate detected by the temperature sensor.

9. The method of claim 8, wherein determining of the final temperature of the display panel comprises:

setting the difference between the determined first temperature of the display panel and the temperature of the substrate detected by the temperature sensor as an offset value, based on the difference being equal to or greater than a reference temperature.

10. The method of claim 9, wherein determining of the final temperature of the display panel further comprises:

determining the final temperature of the display panel by adding the offset value to the determined first temperature of the display panel.

11. The method of claim 8, wherein determining of the final temperature of the display panel comprises:

determining the determined first temperature of the display panel as the final temperature of the display panel, based on the difference between the determined first temperature of the display panel and the temperature of the substrate detected by the temperature sensor being less than a reference temperature.

12. The method of claim 8, further comprising:

performing luminance control for reducing a brightness of light emitted from the plurality of pixel circuits, based on the final temperature of the display panel being equal to or greater than a reference temperature.

13. The method of claim 8, wherein detecting the temperature of the substrate comprises detecting a temperature at an edge region of the substrate, and determining of the final temperature of the display panel comprises:

determining a temperature at an edge region of the display panel based on the look-up table and a current flowing through a pixel circuit corresponding to a position of the temperature sensor from among the plurality of pixel circuits, wherein the difference between the determined first temperature of the display panel and the temperature of the substrate detected by the temperature sensor comprises a difference between the determined temperature at the edge region of the display panel and the temperature at the edge region of the substrate detected by the temperature sensor.

14. The method of claim 13, wherein the determining of the final temperature of the display panel further comprises:

setting the difference between the determined temperature at the edge region of the display panel and the temperature at the edge region of the substrate detected by the temperature sensor as an offset value, based on the difference between the determined temperature at the edge region of the display panel and the temperature at the edge region of the substrate being equal to or greater than a reference temperature; and determining the final temperature of the display panel by adding the offset value to the first temperature of the display panel determined based on the look-up table and the current flowing through the plurality of pixel circuits.

15. The display apparatus of claim 1, wherein each pixel circuit of the plurality of pixel circuits comprises a sensing TFT of the at least one sensing TFT configured to detect a current flowing through the corresponding pixel circuit.

16. The display apparatus of claim 1, wherein the determined first temperature of the display panel is a determined surface temperature of the display panel.

17. The method of claim 8, wherein each pixel circuit of the plurality of pixel circuits comprises a sensing TFT of the at least one sensing TFT configured to detect a current flowing through the corresponding pixel circuit.

18. The method of claim 8, wherein the determined first temperature of the display panel is a determined surface temperature of the display panel.

19. A display apparatus comprising:

a display panel comprising a substrate, and a plurality of pixel circuits disposed on the substrate;

a temperature sensor configured to detect a temperature of the substrate;

at least one processor configured to:

determine a first temperature of the display, determine a final temperature of the display panel based on a difference between the determined first temperature of the display panel and the temperature of the substrate detected by the temperature sensor, and perform luminance control for reducing a brightness of light emitted from the plurality of pixel circuits, based on the final temperature of the display panel.

20. The display apparatus of claim 19, wherein the brightness of light emitted from the plurality of pixel circuits is reduced based on the final temperature of the display panel being equal to or greater than a reference temperature.

* * * * *